US012444382B2

(12) United States Patent
Kadota

(10) Patent No.: US 12,444,382 B2
(45) Date of Patent: Oct. 14, 2025

(54) SOURCE DRIVER, DISPLAY CONTROLLER, AND DISPLAY DEVICE

(71) Applicant: LAPIS Technology Co., Ltd., Yokohama (JP)

(72) Inventor: Daisuke Kadota, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/616,431

(22) Filed: Mar. 26, 2024

(65) Prior Publication Data

US 2024/0331652 A1 Oct. 3, 2024

(30) Foreign Application Priority Data

Mar. 28, 2023 (JP) ................................ 2023-051454

(51) Int. Cl.
*G09G 3/36* (2006.01)
*G09G 5/18* (2006.01)

(52) U.S. Cl.
CPC ............ *G09G 3/3648* (2013.01); *G09G 5/18* (2013.01); *G09G 2300/0452* (2013.01); *G09G 2310/08* (2013.01)

(58) Field of Classification Search
None
See application file for complete search history.

(56) References Cited

U.S. PATENT DOCUMENTS 6,480,180 B1 * 11/2002 Moon .................... G09G 5/006 345/98
2006/0192794 A1 * 8/2006 Larson ................. H04N 21/435 710/16
2016/0314738 A1 * 10/2016 Shiohara ................ H04N 23/63
2017/0053450 A1 * 2/2017 Rodriguez ........... G02B 27/017
2017/0195608 A1 * 7/2017 Shi ........................... H04N 5/60
2018/0006101 A1 * 1/2018 Ha ..................... H10K 59/1213
2018/0061296 A1 * 3/2018 Shim .................... G09G 3/3233

FOREIGN PATENT DOCUMENTS

JP 2018-136370 A 8/2018

* cited by examiner

*Primary Examiner* — Patrick N Edouard
*Assistant Examiner* — Peijie Shen
(74) *Attorney, Agent, or Firm* — Rabin & Berdo, P.C.

(57) ABSTRACT

A source driver that includes an interface unit that obtains the image data and the frame control signal from a plurality of serial data signals, and outputs the image data and frame control signal and a clock signal, a switch signal generation unit that generates a switch signal in a predetermined section among the image data based on the frame control signal, a selection unit that outputs the clock signal as a write enable signal and outputs a part of the image data as setting data for image data control and timing control in the predetermined section of the image data according to the switch signal, a timing control unit that generates a source timing signal based on the frame control signal, the second clock signal, and the setting data, and a source drive unit that generates drive signals in synchronization with the source timing signal.

7 Claims, 8 Drawing Sheets

SOURCE DRIVER, DISPLAY CONTROLLER, AND DISPLAY DEVICE

BACKGROUND

Cross-Reference to Related Application

This application is based upon and claims the benefit of priority from the prior Japanese Patent Application No. 2023-051454 filed on Mar. 28, 2023, the entire contents of which are incorporated herein by reference.

1. TECHNICAL FIELD

The disclosure relates to a source driver that supplies a drive signal to a data line of a display panel, a display controller that supplies image data in the form of a serial signal to the source driver, and a display device including the source driver.

2. DESCRIPTION OF THE RELATED ART

Usually, a display device receives image data and setting data transmitted from an external device, and according to information indicated by the setting data, the image data is processed in a source driver to display an image indicated by the image data on a display panel.

Japanese Patent Kokai No. 2018-136370 discloses a display device including a command interface unit and a display interface unit inside a source driver. The command interface unit receives a command as setting data transmitted from an external processing device, and the display interface unit receives image data transmitted from the external processing device via a display controller. In the display device, the display interface unit performs communication with the display controller. As a communication method thereof, for example, a Low Voltage Differential Signal (LVDS) method, an RGB serial method, and the like are employed.

In a display device using a communication method such as the LVDS method like Japanese Patent Kokai No. 2018-136370, as described above, the command interface unit and the display interface unit as receiving circuits are individually provided. For example, a system for writing setting data, such as a command, into a register inside the source driver, and a system for writing image data into the register are each formed, and input terminals for the setting data and the image data of the source driver are also prepared individually for each system.

Accordingly, in a configuration of a conventional source driver, due to a possibility of a format being different or the timing of access being simultaneous, as disclosed in Japanese Patent Kokai No. 2018-136370, an interface unit is provided for each of these setting data and image data, and it has been difficult to share a single interface unit. As a result, in the conventional source driver, there has been a problem that the number of input terminals needed for an operation setting increases, the cost increases, and also a chip size increases.

Therefore, an object of the disclosure is to provide a source driver, a display controller, and a display device that allows reducing the number of input terminals and downsizing a chip size.

SUMMARY

A source driver according to the disclosure is supplied with a plurality of serial data signals together with a first clock signal from outside, the serial data signal indicating image data and a frame control signal regarding vertical synchronization timing and horizontal synchronization timing of the image data, the serial data signal including setting data for image data control and timing control in a predetermined section of the image data, the first clock signal indicating synchronization timing of the plurality of serial data signals, the source driver comprising: an interface unit that sequentially receives the plurality of serial data signals and the first clock signal, obtains the image data and the frame control signal from the received plurality of serial data signals, and outputs the obtained image data and frame control signal and a second clock signal based on the first clock signal; a switch signal generation unit that generates a switch signal in the predetermined section among the image data being output from the interface unit based on the frame control signal output from the interface unit; a selection unit that outputs the second clock signal as a write enable signal and outputs a part of the image data as the setting data according to the switch signal; a register that stores the setting data according to the write enable signal; a timing control unit that generates a source timing signal based on the frame control signal and the second clock signal output from the interface unit and the setting data stored in the register; an image data control unit that generates display data for a plurality of data lines of a display panel based on the image data and the second clock signal output from the interface unit and the setting data stored in the register; and a source drive unit that generates drive signals having gradation voltages for the plurality of data lines, respectively corresponding to the display data in synchronization with the source timing signal, and outputs the drive signals to the plurality of data lines of the display panel.

A display controller according to the disclosure converts image data into a plurality of serial data signals to supply the image data to a source driver, the display controller comprising: an image data input unit that receives the image data; a frame control signal generation unit that generates a frame control signal regarding vertical synchronization timing and horizontal synchronization timing of the image data; a data format conversion unit that converts setting data for image data control and timing control in the source driver into image-formatted setting data having a same format as the image data; a switch signal generation unit that specifies a predetermined section of the image data based on the frame control signal and generates a switch signal in the predetermined section; and a serial data signal generation unit that sequentially generates the plurality of serial data signals and a first clock signal indicating synchronization timing of the plurality of serial data signals based on the image data and the frame control signal, and sequentially generates the plurality of serial data signals and the first clock signal based on the image-formatted setting data and the frame control signal instead of the image data during a generation period of the switch signal.

A display device according to the disclosure comprises: a display panel including a plurality of data lines and a plurality of gate lines and display cells provided in a matrix at respective intersection portions of the plurality of data lines and the plurality of gate lines; a display controller that converts input image data into a plurality of serial data signals and outputs the plurality of serial data signals together with a first clock signal indicating synchronization timing of the plurality of serial data signals, the serial data signals indicating the input image data together with a frame control signal regarding vertical synchronization timing and horizontal synchronization timing of the image data and including setting data for image data control and timing control in a predetermined section of the image data; a gate driver that is connected to the plurality of gate lines, selects the plurality of gate lines in a predetermined order, and supplies a gate signal to the selected gate line; and a source driver supplied with the plurality of serial data signals and the first clock signal output from the display controller, wherein the source driver includes: an interface unit that sequentially receives the plurality of serial data signals and the first clock signal, obtains the image data and the frame control signal from the received plurality of serial data signals, and outputs the obtained image data and frame control signal and a second clock signal based on the first clock signal; a switch signal generation unit that generates a switch signal in the predetermined section among the image data that is being output from the interface unit based on the frame control signal output from the interface unit; a selection unit that outputs the second clock signal as a write enable signal and outputs at least a part of the image data as the setting data according to the switch signal; a register that stores the setting data according to the write enable signal; a timing control unit that generates a source timing signal based on the frame control signal and the second clock signal output from the interface unit and the setting data stored in the register; an image data control unit that generates display data for the plurality of data lines based on the image data and the second clock signal output from the interface unit and the setting data stored in the register; and a source drive unit that generates drive signals having gradation voltages for the plurality of data lines, respectively corresponding to the display data in synchronization with the source timing signal, and outputs the drive signals to the plurality of data lines.

DETAILED DESCRIPTION

According to the source driver, the display controller, and the display device of the disclosure, since data of a portion corresponding to the predetermined section of the serial data signal supplied to the source driver is replaced with the setting data, there is no need to supply the setting data to the source driver via another line. Thus, it is not necessary to provide an input terminal or an interface unit exclusive for the setting data in the source driver, and therefore the number of input terminals of the source driver can be reduced, and the chip size can be downsized.

The disclosure will be described in detail below as Embodiments with reference to the drawings.

Figure 1:
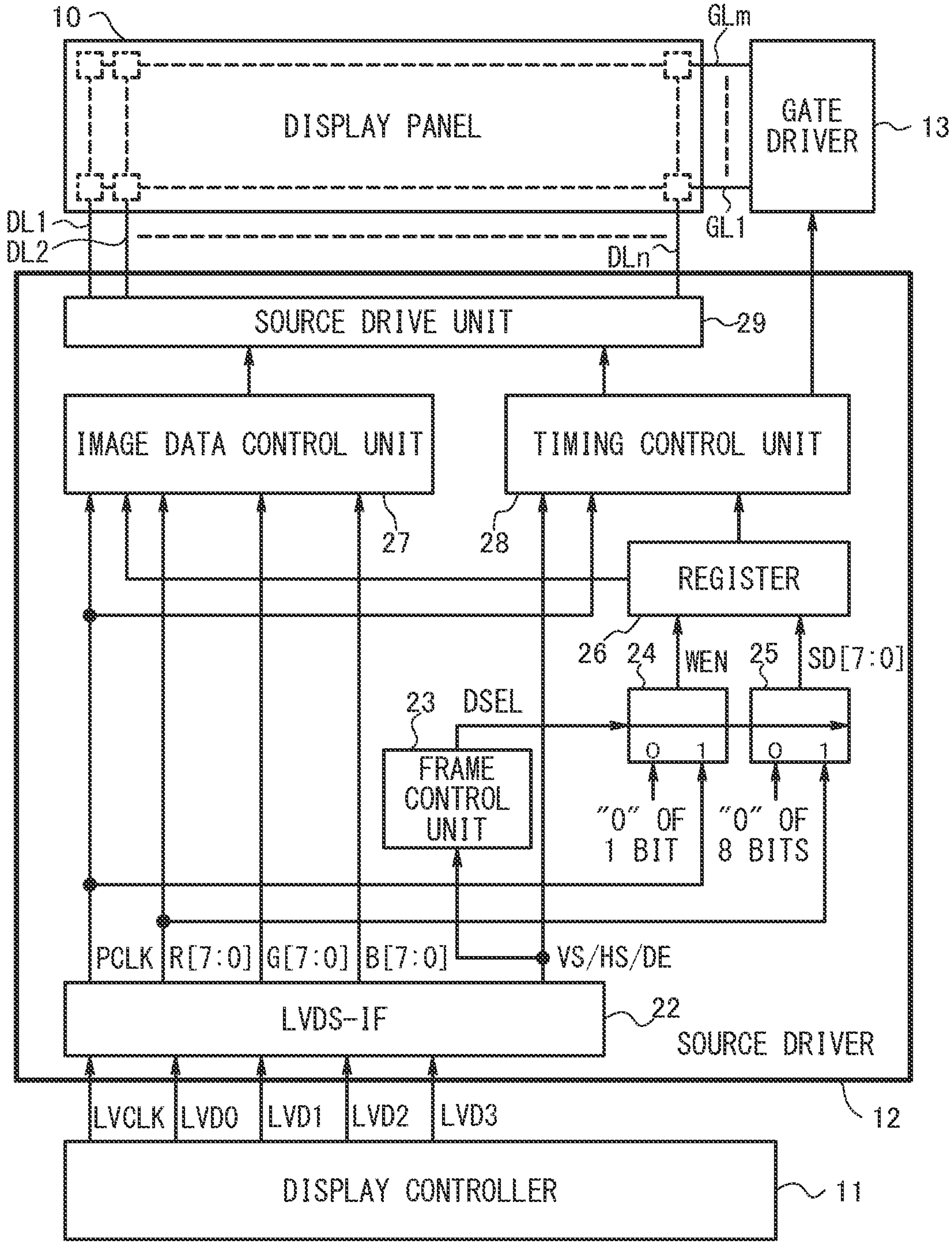
FIG. 1 is a block diagram illustrating a configuration of a display device of Embodiment 1.

FIG. 1 illustrates a configuration of a display device of Embodiment 1. In FIG. 1, this display device includes a display panel 10, a display controller 11, a source driver 12, and a gate driver 13.

The display panel 10 is constituted of a liquid crystal display panel, for example, and includes m (m is a natural number of 2 or more) gate lines GL1 to GLm extending in a horizontal direction of a two-dimensional screen, and n (n is an even number of 2 or more) source lines DL1 to DLn extending in a vertical direction of the two-dimensional screen. At respective intersection portions of the gate lines GL1 to GLm and the source lines DL1 to DLn, display cells (regions surrounded by dashed lines) that perform display of a red color, a green color, or a blue color are formed.

The display controller 11 inputs image data VD from outside, and also inputs setting data SD to be written into a register 26 described later inside the source driver 12. The setting data SD is data unique to a display device used for image data control and timing control inside the source driver 12, and indicates, for example, the number of gate lines GL1 to GLm and the number of source lines DL1 to DLn of the display panel 10.

The display controller 11 generates a frame control signal constituted of vertical synchronization data VS, horizontal synchronization data HS, and data enable DE for each pixel based on the image data VD, and based on those data, outputs output signals in the Low Voltage Differential Signal (LVDS) format, that is, low voltage differential signals. The vertical synchronization data VS, the horizontal synchronization data HS, and the data enable DE are each 1 bit data. For example, the vertical synchronization data VS is data that indicates logic 0 at a point equivalent to the generation of a vertical synchronization pulse, and indicates logic 1 at other times. The horizontal synchronization data HS is data that indicates logic 0 at a point equivalent to the generation of the vertical synchronization pulse, and indicates logic 1 at other times. Further, the data enable DE is data that is logic 0 when the image data VD is valid, and is logic 1 when the image data VD is invalid. The output signals in the LVDS format are five serial signals constituted of a clock LVCLK (first clock signal) and four serial data signals LVD0 to LVD3. The display controller 11 outputs the serial data signals LVD0 to LVD3 for one pixel per one cycle (one LVCLK cycle) of the clock LVCLK as a data packet.

The source driver 12 is constituted of a Low Voltage Differential Signal-Interface (LVDS-IF) 22, a frame control unit 23, selection units 24, 25, the register 26, an image data control unit 27, a timing control unit 28, and a source drive unit 29.

The LVDS-IF 22 is an interface unit that is connected to the display controller 11, and receives the clock LVCLK and the serial data signals LVD0 to LVD3, which are the output signals of the display controller 11. Based on the received clock LVCLK and serial data signals LVD0 to LVD3, the LVDS-IF 22 generates a clock PCLK (second clock signal), R (red color) component data R[7:0], G (green color) component data G[7:0], B (blue color) component data B[7:0], and a frame control signal VS/HS/DE. The R component data R[7:0], the G component data G[7:0], and the B component data B[7:0] are 8 bit data indicating the luminance of each color in one pixel, and are generated in synchronization with the clock PCLK. The frame control signal VS/HS/DE is constituted of the above-described vertical synchronization data VS, horizontal synchronization data HS, and data enable DE, and is generated in synchronization with the clock PCLK. Note that the R component data R[7:0] represents setting data SD[7:0] in some cases as described later.

The frame control unit 23 is a portion equivalent to a switch signal generation unit, and includes a counter (not illustrated). The frame control unit 23 is connected to an output terminal of the frame control signal VS/HS/DE of the LVDS-IF 22. Also, the frame control unit 23 receives the frame control signal VS/HS/DE from the LVDS-IF 22, counts the vertical synchronization data VS among the frame control signal VS/HS/DE, and when the VS count value becomes value 0 corresponding to a display invalid section (predetermined section), generates a select signal DSEL (switch signal) at a high (H) level. When the VS count value is a value other than 0, the frame control unit 23 generates the select signal DSEL at a low (L) level. The display invalid section is a period in which an image in the image data VD is not displayed on the display panel 10.

Each of the selection units 24, 25 is a 2-input and 1-output selection circuit, and performs a selection operation according to the level of the select signal DSEL output from the frame control unit 23. The "$_0$" end on one side of the 2 inputs of the selection unit 24 is supplied with a 1 bit signal indicating a fixed 0, and the "1" end on the other side is connected to an output terminal of the clock PCLK of the LVDS-IF 22. The "0" end on one side of the 2 inputs of the selection unit 25 is supplied with an 8 bit signal indicating a fixed 0, and the "1" end on the other side is connected to an output terminal of the R component data R[7:0] of the LVDS-IF 22. When the select signal DSEL is at a low level, each of the selection units 24, 25 outputs the signal at the "0" end on the one side, and when the select signal DSEL is at a high level, each of the selection units 24, 25 outputs the signal at the "1" end on the other side. When the select signal DSEL is at a high level, the selection unit 24 outputs the clock PCLK as a write enable signal WEN. When the select signal DSEL is at a high level, the selection unit 25 outputs the R component data R[7:0] as the setting data SD[7:0].

The register 26 is connected to the respective output terminals of the selection units 24, 25. The register 26 receives the setting data SD[7:0], which is the output 8-bit data of the selection unit 25, according to the write enable signal WEN from the selection unit 24, and stores the setting data. The setting data is data indicating information unique to the display device. Examples of the setting data include specification information, such as the number of horizontal scanning lines m and the number of vertical scanning lines n of the display panel 10, and scanning timing information, and control information, such as the luminance of the display panel 10.

The image data control unit 27 is connected to the respective output terminals of the clock PCLK and the R, G, B component data R[7:0], G[7:0], B[7:0] of the LVDS-IF 22. In addition, the image data control unit 27 is connected to the register 26, and obtains the specification information regarding the display panel 10, for example, as the setting data for image data control stored in the register 26. The specification information regarding the display panel 10 includes data of the number of horizontal scanning lines m and the number of vertical scanning lines n. When n pixels of the R, G, B component data R[7:0], G[7:0], B[7:0] are obtained as the display data for each horizontal scanning line from the LVDS-IF 22 according to the clock PCLK, the display data is supplied to the source drive unit 29. The supply of the display data is repeated by the number of horizontal scanning lines m in one frame, and the operation is repeated for each frame.

The timing control unit 28 is connected to the respective output terminals of the clock PCLK and the frame control signal VS/HS/DE of the LVDS-IF 22. Also, the timing control unit 28 is connected to the register 26, and obtains the specification information regarding the display panel 10, for example, as the setting data for timing control stored in the register 26. The timing control unit 28 supplies a source timing signal to the source drive unit 29 and a gate timing signal to the gate driver 13 based on the clock PCLK and the frame control signal VS/HS/DE so as to correspond to the specification information on the display panel 10.

The source drive unit 29 retrieves the display data of the R, G, B component data R[7:0], G[7:0], B[7:0] from the image data control unit 27 by each horizontal scanning line (n lines), and converts each of the display data into a pixel drive signal having an analog voltage value corresponding to the luminance level. Then, the source drive unit 29 supplies the generated n pixel drive signals to the respective source lines DL1 to DLn of the display panel 10 according to the source timing signal.

The gate driver 13 sequentially generates gate selection signals including at least one pulse for selecting the gate line according to the gate timing signal supplied from the timing control unit 28, and supplies the gate selection signals to the respective gate lines GL1 to GLm of the display panel 10.

Figure 2:
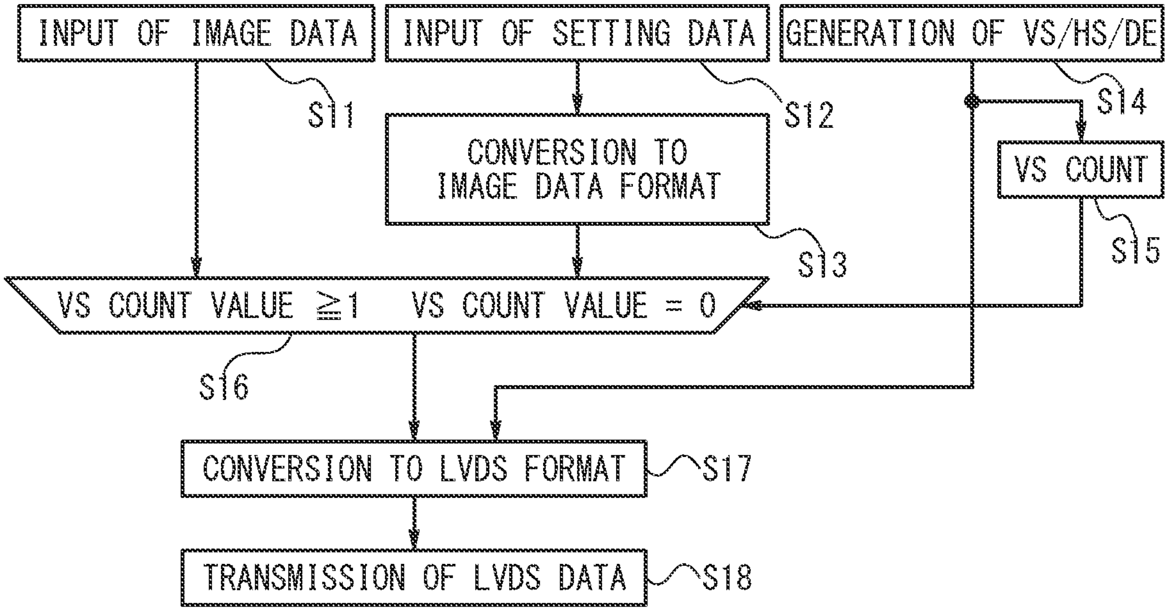
FIG. 2 is a flowchart illustrating an operation of a display controller in the display device of FIG. 1.

Next, the operation of the display controller 11 in the display device of Embodiment 1 having the above configuration is first described using the flowchart of FIG. 2. In the display controller 11, the image data VD is input from outside (Step S11), and the setting data SD is similarly input from outside (Step S12). The setting data SD is converted to an image data format (Step S13). By executing Step S13, a data format conversion unit is formed. In Step S13, every 8 bits of the setting data SD is rewritten into, for example, one LVCLK cycle of the R component data R[7:0]. That is, 1 bit units SD to SD of the 8-bit setting data SD[7:0] are replaced with 1 bit units R to R of the R component data R[7:0]. Thus, image-formatted setting data is generated.

Meanwhile, the frame control signal constituted of the vertical synchronization data VS, the horizontal synchronization data HS, and the data enable DE is generated based on the image data VD (Step S14). The vertical synchronization data VS are counted (Step S15).

Assuming that the count value of the vertical synchronization data VS is the VS count value, when the VS count value reaches a predetermined value, it is determined to be in the display invalid section and the VS count value is reset to 0. By executing Step S15, the switch signal generation unit is formed, and when the VS count value reaches a predetermined value, a switch signal is generated.

When the VS count value is 1 or more, the image data is selected and the image data is read out sequentially, and on the other hand, when the VS count value is 0, the image-formatted setting data generated in Step S13 is selected according to the switch signal and the image-formatted setting data is read out sequentially (Step S16).

The data read out in Step S16 is converted to the LVDS format (Step S17), and the clock LVCLK and the four serial data signals LVD0 to LVD3 obtained as a result of the conversion are transmitted to the LVDS-IF 22 of the source driver 12 (Step S18). By executing the Steps S17, S18, a serial data signal generation unit is formed.

Figure 3:
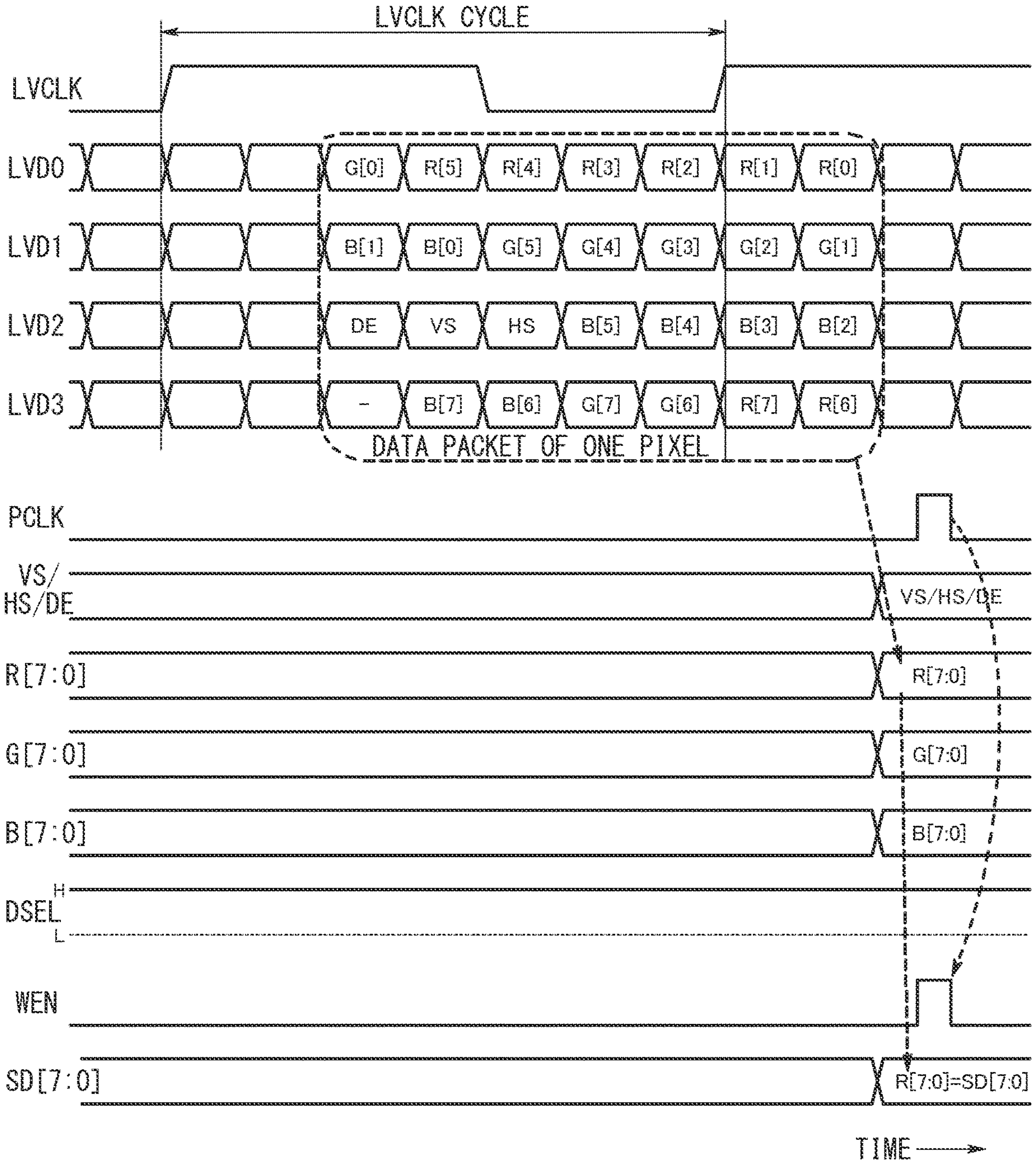
FIG. 3 is a timing chart illustrating an operation of the display device of FIG. 1.

As for the output signals LVCLK, LVD0 to LVD3 in the LVDS format transmitted in Step S18, as illustrated in FIG. 3, a data packet for one pixel is output for each LVCLK cycle determined by the clock LVCLK. The data packet for one pixel is constituted of 4×7 bits, which includes the vertical synchronization data VS, the horizontal synchronization data HS, and the data enable DE, as well as the 1 bit units R to R of the R component data R[7:0], the 1 bit units G to G of the G component data G[7:0], and the 1 bit units B to B of the B component data B[7:0]. In the data packet for one pixel in the display invalid section, the 1 bit units R to R of the R component data R[7:0] can represent the 1 bit units SD to SD of the setting data SD[7:0].

Thus, the output signals LVCLK, LVD0 to LVD3 in the LVDS format output from the display controller 11 are supplied to the LVDS-IF 22. In the LVDS-IF 22, as illustrated in FIG. 3, the clock PCLK is generated and also the frame control signal VS/HS/DE, the R component data R[7:0], the G component data G[7:0], and the B component data B[7:0] are output for each data packet. That is, the vertical synchronization data VS, the horizontal synchronization data HS, and the data enable DE are each taken out from inside the data packet for one pixel, and the frame control signal VS/HS/DE constituted of 8 bits including the above mentioned data is generated, for example. In addition, the 1 bit units R to R, G to G, and B to B are each taken out from inside the data packet for one pixel, and they become the 8-bit R component data R[7:0], G component data G[7:0], and B component data B[7:0], respectively. The clock PCLK, the R component data R[7:0], the G component data G[7:0], and the B component data B[7:0] are supplied to the image data control unit 27. In addition, the clock PCLK is also supplied to the timing control unit 28. The frame control signal VS/HS/DE is supplied to the frame control unit 23 and the timing control unit 28.

Figure 4:
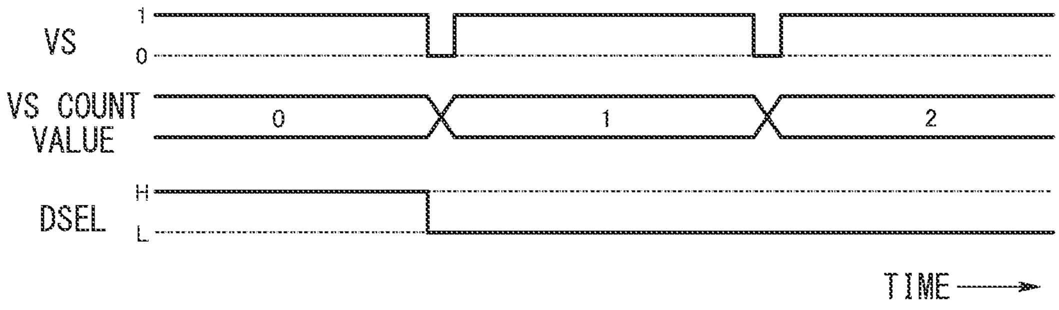
FIG. 4 is a timing chart illustrating an operation related to a VS count of the display device of FIG. 1.

In the frame control unit 23, the vertical synchronization data VS among the frame control signal VS/HS/DE are counted. For example, as illustrated in FIG. 4, the vertical synchronization data VS represents logic 0 at the point corresponding to the vertical synchronization pulse, and represents logic 1 at other times. The VS count value proceeds every time the vertical synchronization data VS among the frame control signal VS/HS/DE supplied from the LVDS-IF 22 represents logic 0. When the VS count value becomes value 0, the select signal DSEL at a high level is generated by the frame control unit 23. The period in which the select signal DSEL at a high level is generated is the display invalid section. As illustrated in FIG. 4, the display invalid section in which the select signal DSEL is at a high level continues until the frame control signal VS/HS/DE including the vertical synchronization data VS representing logic 0 is next supplied.

In addition, as illustrated in FIG. 3, when the select signal DSEL at a high level is supplied to the selection units 24, 25, the clock PCLK supplied from the LVDS-IF 22 is selected in the selection unit 24, and the clock PCLK is output as the write enable signal WEN. In the selection unit 25, the R component data R[7:0] supplied from the LVDS-IF 22 is selected, and the R component data R[7:0] is output as the setting data SD[7:0] from the selection unit 25.

As a result, the write enable signal WEN and the setting data SD[7:0] are supplied to the register 26, and thus the setting data SD[7:0] is written into the register 26 by the write enable signal WEN. By the setting data SD[7:0] being sequentially written into the register 26, the above-described specification information and control information on the display panel 10 are stored in the register 26.

The specification information and control information on the setting data stored in the register 26 are read out in the image data control unit 27 and the timing control unit 28. In the image data control unit 27, for example, n pixels of the R, G, B component data R[7:0], G[7:0], B[7:0] are obtained as display data for each horizontal scanning line from the LVDS-IF 22 according to the specification information on the display panel 10, and the display data is supplied to the source drive unit 29. In addition, in the image data control unit 27, for example, when the setting data SD[7:0] is additionally written into the register 26, the setting data SD[7:0] is read out, and a process on the setting data SD[7:0] is performed. For example, when control information regarding the luminance of the display panel 10 is additionally written into the register 26, the information is read out in the image data control unit 27 and control of the data values of the respective R, G, B component data R[7:0], G[7:0], B[7:0] is performed.

In the timing control unit 28, a source timing signal is supplied to the source drive unit 29 based on the clock PCLK and the frame control signal VS/HS/DE so as to correspond to the specification information on the display panel 10 read out from the register 26, and also a gate timing signal is supplied to the gate driver 13.

Thus, according to Embodiment 1, since the R component data R[7:0] positioned corresponding to the display invalid sections in the serial data signals LVD0 to LVD3 supplied to the LVDS-IF 22 of the source driver 12 from the display controller 11 is replaced with the setting data SD[7:0], there is no need to supply the setting data SD to the source driver 12 via another line. Accordingly, it is not necessary to provide an input terminal or an interface unit exclusive for the setting data SD in the source driver 12, and therefore the number of input terminals of the source driver 12 can be reduced, and the chip size can be downsized.

In Embodiment 1, the R component data R[7:0] of the display invalid section is assumed to be the setting data SD[7:0], but the G component data G[7:0] or the B component data B[7:0] may be the setting data SD[7:0], or the R, G, B component data R[7:0], G[7:0], B[7:0] may all be the setting data SD[7:0].

Moreover, in Embodiment 1, the display invalid section is a period extending over one frame according to the VS count, but it is not limited to this, and may be a period that is a part within one frame. For example, the display invalid section as a part within one frame that is not displayed on the display panel 10 may be specified by counting the number of horizontal scanning lines within one frame based on the horizontal synchronization data HS in the frame control unit 23.

Figure 5:
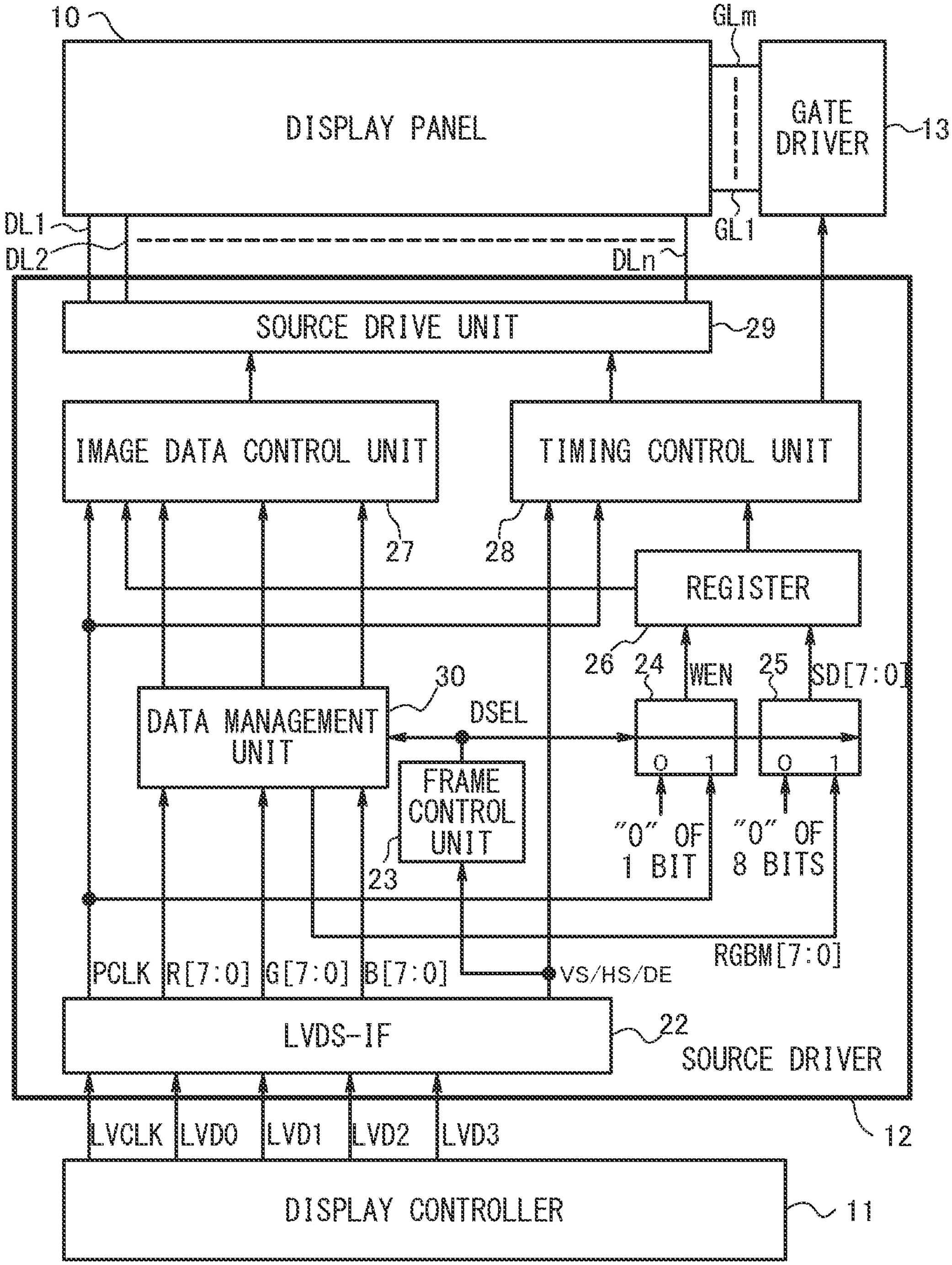
FIG. 5 is a block diagram illustrating a configuration of a display device of Embodiment 2.

FIG. 5 illustrates a configuration of a display device as Embodiment 2. In FIG. 5, similarly to Embodiment 1, the display device includes the display panel 10, the display controller 11, the source driver 12, and the gate driver 13. The display panel 10, the display controller 11, and the gate driver 13 illustrated in FIG. 5 are the same as those of Embodiment 1 illustrated in FIG. 1.

The source driver 12 of Embodiment 2 illustrated in FIG. 5 includes the LVDS-IF 22, the frame control unit 23, the selection units 24, 25, the register 26, the image data control unit 27, the timing control unit 28, the source drive unit 29, and also a data management unit 30.

The data management unit 30 is connected to the respective output terminals of the R, G, B component data R[7:0], G[7:0], B[7:0] of the LVDS-IF 22. In addition, the data management unit 30 is supplied with the select signal DSEL from the frame control unit 23. When the select signal DSEL at a low level is supplied, the data management unit 30 directly supplies the R, G, B component data R[7:0], G[7:0], B[7:0] from the LVDS-IF 22 to the image data control unit 27. When the select signal DSEL at a high level is supplied, the data management unit 30 extracts the R, G, B component data R[2:0], G[2:0], B[1:0] among the R, G, B component data R[7:0], G[7:0], B[7:0] from the LVDS-IF 22 as the 8-bit data RGBM[7:0], and supplies the 8-bit data RGBM[7:0] to the selection unit 25. R[2:0] is 1 bit units R to R among the R component data R[7:0], G[2:0] is 1 bit units G to G among the G component data G[7:0], and B[1:0] is 1 bit units B, B among the B component data B[7:0].

In the source driver 12 of Embodiment 2, the "1" end of the selection unit 25 is connected to the data management unit 30 instead of the output terminal of the R component data R[7:0] of the LVDS-IF 22. That is, the "1" end of the selection unit 25 is supplied with the 8-bit data RGBM[7:0] from the data management unit 30. When the select signal DSEL is at a high level, the selection unit 25 outputs the 8-bit data RGBM[7:0] as the setting data SD[7:0].

Other configurations of Embodiment 2 are the same as those of Embodiment 1, and therefore repeated descriptions will be omitted here.

Figure 6:
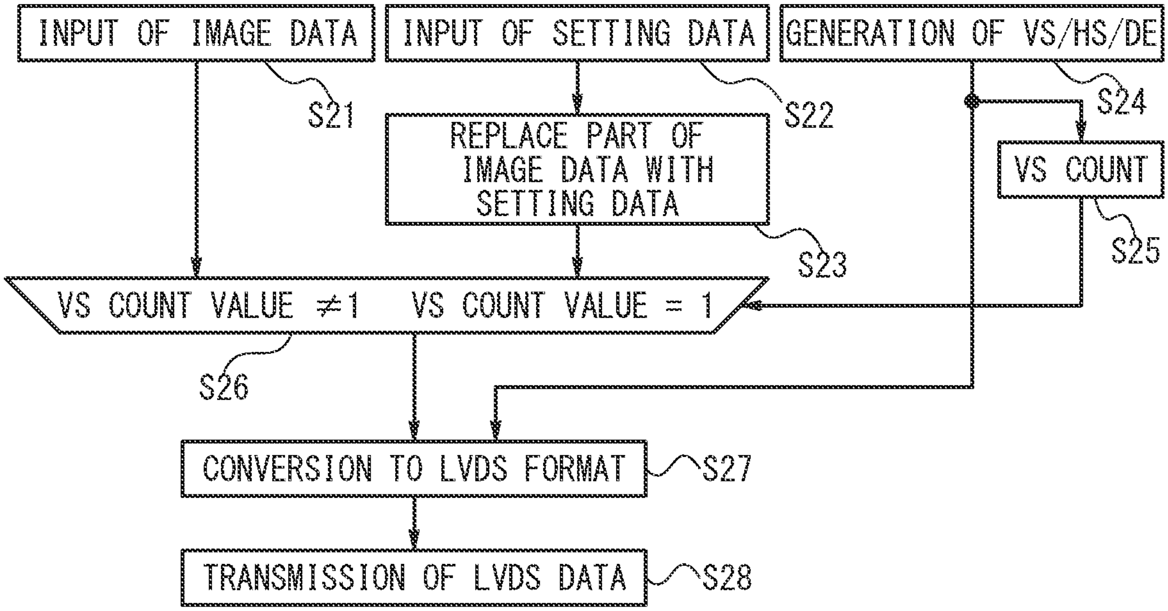
FIG. 6 is a flowchart illustrating an operation of a display controller in the display device of FIG. 5.

Next, the operation of the display controller 11 in the display device of Embodiment 2 having the above configuration will first be described using the flowchart of FIG. 6. In the display controller 11, the image data VD is input from outside (Step S21), and the setting data SD is similarly input from outside (Step S22). A part of the image data VD is replaced with the setting data SD (Step S23). In Step S23, for example, every 8 bits of the setting data SD is replaced with parts of the R, G, B component data R[7:0], G[7:0], B[7:0] of the image data in one LVCLK cycle. That is, the first 3 bits among the 8 bits of the setting data SD are replaced with the R[2:0] among the R component data R[7:0], the subsequent 3 bits are replaced with the G[2:0] among the G component data G[7:0], and the remaining 2 bits are replaced with the B[1:0] among the B component data B[7:0], and image-formatted setting data is generated.

Meanwhile, the frame control signal constituted of the vertical synchronization data VS, the horizontal synchronization data HS, and the data enable DE is generated based on the image data VD (Step S24). The vertical synchronization data VS are counted (Step S25). Assuming that the count value of the vertical synchronization data VS is the VS count value, when the VS count value reaches a predetermined value, it is reset to 0.

When the VS count value is other than 1, the image data is selected in Step S21 and the image data is read out sequentially, and on the other hand, when the VS count value is 1, the image-formatted setting data that is partially replaced with the setting data SD in Step S23 is selected, and the replaced image-formatted setting data is read out sequentially (Step S26). The VS count value=1 when the image data VD is in a specific display section (predetermined section). The image data read out in Step S26 is converted to the LVDS format (Step S27), and the clock LVCLK and the four serial data signals LVD0 to LVD3 obtained by the conversion are transmitted (Step S28).

Figure 7:
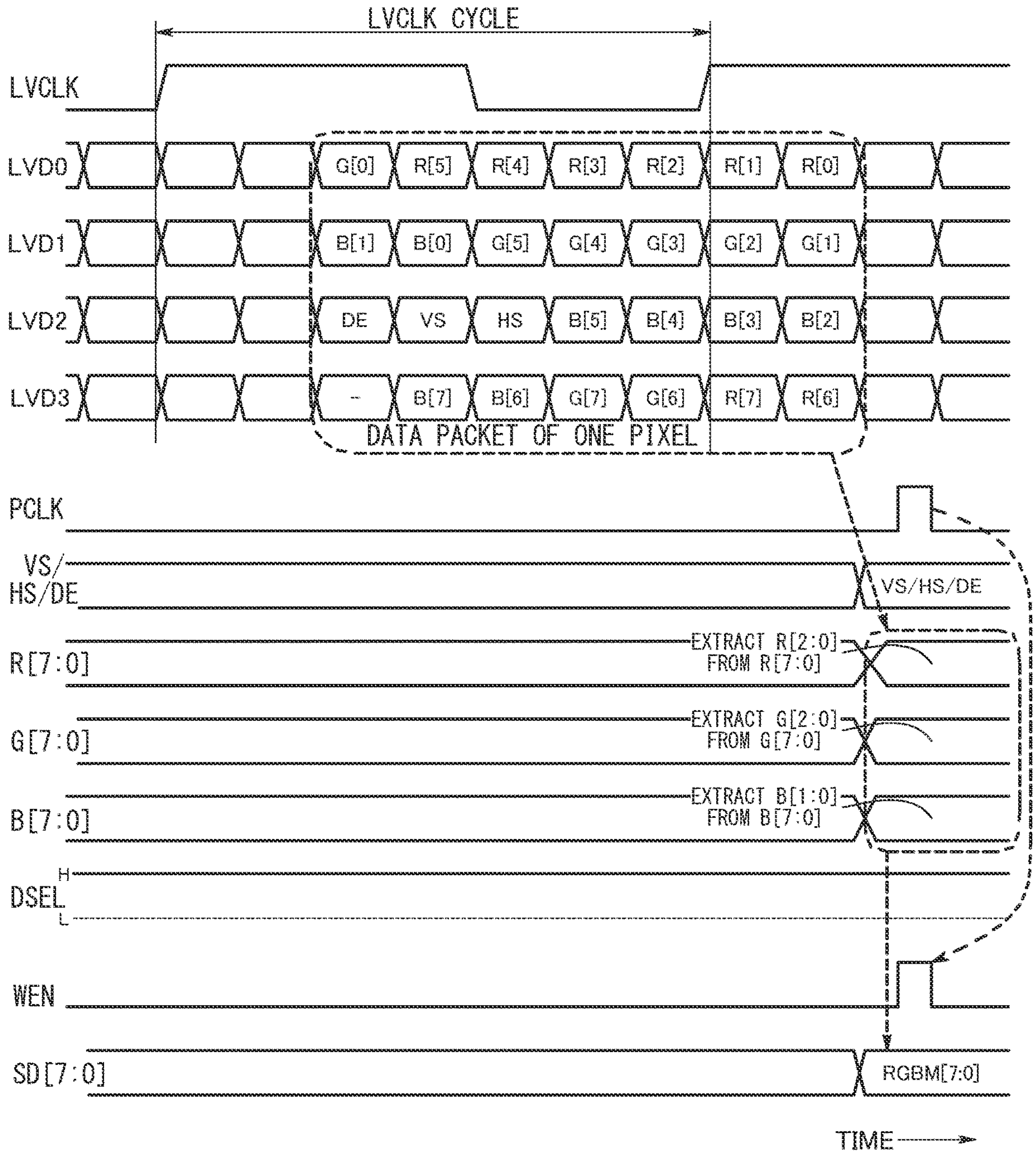
FIG. 7 is a timing chart illustrating an operation of a display device of FIG. 5.

As for the output signals LVCLK, LVD0 to LVD3 in the LVDS format output in Step S28, as illustrated in FIG. 7, a data packet for one pixel is output for each LVCLK cycle determined by the clock LVCLK. The data packet for one pixel is constituted of 4×7 bits, which includes the vertical synchronization data VS, the horizontal synchronization data HS, and the data enable DE, as well as the 1 bit units R to R of the R component data R[7:0], the 1 bit units G to G of the G component data G[7:0], and the 1 bit units B to B of the B component data B[7:0]. In the data packet for one pixel in the specific display section, the 1 bit units R to R of the R component data R[7:0], the 1 bit units G to G of the G component data G[7:0], and the 1 bit units B, B of the B component data B[7:0] represent the 1 bit units SD to SD of the setting data SD[7:0].

Thus, the output signals LVCLK, LVD0 to LVD3 in the LVDS format output from the display controller 11 are supplied to the LVDS-IF 22. In the LVDS-IF 22, as illustrated in FIG. 7, the clock PCLK is generated and also the frame control signal VS/HS/DE, the R component data R[7:0], the G component data G[7:0], and the B component data B[7:0] are output for each data packet. That is, the vertical synchronization data VS, the horizontal synchronization data HS, and the data enable DE are each taken out from inside the data packet for one pixel, and the frame control signal VS/HS/DE constituted of 8 bits including the above mentioned data is generated, for example. In addition, the 1 bit units R to R, G to G, and B to B are each taken out from inside the data packet for one pixel, and they become the 8-bit R component data R[7:0], G component data G[7:0], and B component data B[7:0], respectively. The clock PCLK, the R component data R[7:0], the G component data G[7:0], and the B component data B[7:0] are supplied to the image data control unit 27. In addition, the clock PCLK is also supplied to the timing control unit 28. The frame control signal VS/HS/DE is supplied to the frame control unit 23 and the timing control unit 28.

Figure 8:
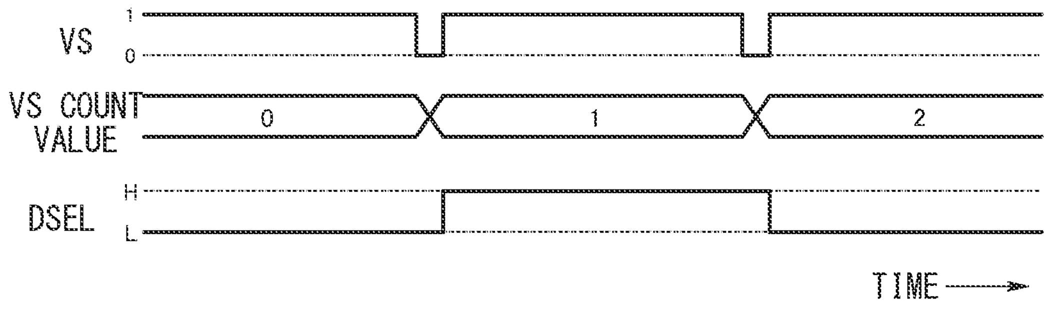
FIG. 8 is a timing chart illustrating an operation related to a VS count of the display device of FIG. 5.

In the frame control unit 23, the vertical synchronization data VS among the frame control signal VS/HS/DE are counted. For example, as illustrated in FIG. 8, the vertical synchronization data VS represents logic 0 at the point corresponding to the vertical synchronization pulse, and represents logic 1 at other times. The VS count value proceeds every time the vertical synchronization data VS among the frame control signal VS/HS/DE supplied from the LVDS-IF 22 represents logic 0. The VS count value becomes value 1 when corresponding to the specific display section. When the VS count value=1, the select signal DSEL at a high level is generated by the frame control unit 23. As illustrated in FIG. 8, the period in which the select signal DSEL is at a high level continues until the frame control signal VS/HS/DE including the vertical synchronization data VS representing logic 0 is next supplied.

When the select signal DSEL at a high level is supplied to the data management unit 30, in the data management unit 30, the R, G, B component data R[2:0], G[2:0], B[1:0] are extracted among the R, G, B component data R[7:0], G[7:0], B[7:0] from the LVDS-IF 22, and the extracted 8 bits are assumed to be the 8 bits data RGBM[7:0]. The 8-bit data RGBM[7:0] is supplied to the selection unit 25.

In addition, as illustrated in FIG. 7, when the select signal DSEL at a high level is supplied to the selection units 24, 25, the clock PCLK supplied from the LVDS-IF 22 is selected in the selection unit 24, and the clock PCLK is output as the write enable signal WEN. In the selection unit 25, the R component data RGBM[7:0] supplied from the data management unit 30 is selected, and the R component data RGBM[7:0] is output as the setting data SD[7:0] from the selection unit 25.

As a result, the write enable signal WEN and the setting data SD[7:0] are supplied to the register 26, and thus the setting data SD[7:0] is written into the register 26 by the write enable signal WEN. By the setting data SD[7:0] being sequentially written into the register 26, the above-described specification information and control information on the display panel 10 are stored in the register 26.

In each of the image data control unit 27 and the timing control unit 28 of Embodiment 2, the specification information and the control information stored in the register 26 are used. This is the same as in Embodiment 1, and therefore further description will be omitted here.

Thus, according to Embodiment 2, the data R[2:0], G[2:0], B[1:0], which are parts of the R, G, B component data R[7:0], G[7:0], B[7:0] positioned corresponding to specific display sections in the serial data signals LVD0 to LVD3 supplied to the LVDS-IF 22 of the source driver 12 from the display controller 11, are replaced with the setting data SD[7:0], and therefore there is no need to supply the setting data SD to the source driver 12 via another line. Accordingly, it is not necessary to provide an input terminal or an interface unit exclusive for the setting data SD in the source driver 12, and therefore the number of input terminals of the source driver 12 can be reduced, and the chip size can be downsized.

Note that in Embodiment 2, the replacement with the setting data is performed in the specific display sections of the serial data signals LVD0 to LVD3, but the specific display sections may be the display invalid sections similarly to Embodiment 1.

Moreover, the positions of the R, G, B component data in the serial data signals LVD0 to LVD3 that are replaced with the setting data SD in Embodiment 2 are not limited to R[2:0], G[2:0], B[1:0]. Other partial positions of the R[7:0], G[7:0], B[7:0] may be replaced with the setting data SD.

What is claimed is:

1. A source driver supplied with a plurality of serial data signals together with a first clock signal from outside, the serial data signal indicating image data and a frame control signal regarding vertical synchronization timing and horizontal synchronization timing of the image data, the serial data signal including setting data for image data control and timing control in a predetermined section of the image data, the first clock signal indicating synchronization timing of the plurality of serial data signals, the source driver comprising:

an image data and clock receiver that sequentially receives the plurality of serial data signals and the first clock signal, obtains the image data and the frame control signal from the received plurality of serial data signals, and outputs the obtained image data and frame control signal and a second clock signal based on the first clock signal;

a switch signal generator that generates a switch signal in the predetermined section among the image data being output from the image data and clock receiver based on the frame control signal output from the image data and clock receiver;

a selector that outputs the second clock signal as a write enable signal and outputs a part of the image data as the setting data according to the switch signal;

a register that stores the setting data according to the write enable signal;

a source timing signal generator that generates a source timing signal based on the frame control signal and the second clock signal output from the image data and clock receiver and the setting data stored in the register;

a display data generator that generates display data for a plurality of data lines of a display panel based on the image data and the second clock signal output from the image data and clock receiver and the setting data stored in the register; and a drive signal generator that generates drive signals having gradation voltages for the plurality of data lines, respectively corresponding to the display data in synchronization with the source timing signal, and outputs the drive signals to the plurality of data lines of the display panel.

2. The source driver according to claim 1, wherein the plurality of serial data signals are signals including a data packet which has red color component data, green color component data, blue color component data, and the frame control signal for one pixel of the image data for each cycle period of the first clock signal, and the red color component data in the data packet corresponding to the predetermined section is replaced with the setting data.

3. The source driver according to claim 1, wherein the plurality of serial data signals are signals including a data packet which has red color component data, green color component data, blue color component data, and the frame control signal for one pixel of the image data for each cycle period of the first clock signal, and a part of each of the red color component data, the green color component data, and the blue color component data in the data packet corresponding to the predetermined section is replaced with the setting data.

4. The source driver according to claim 1, wherein the frame control signal indicates vertical synchronization data, horizontal synchronization data, and data enable of the image data.

5. The source driver according to claim 1, wherein the plurality of serial data signals and the first clock signal are communication signals in a low voltage differential signal (LVDS) format.

6. The source driver according to claim 4, wherein the switch signal generator includes a counter that counts a number of times the vertical synchronization data indicates a predetermined logical value, and determines to be in the predetermined section when a count value of the counter reaches a predetermined value.

7. The source driver according to claim 1, wherein the predetermined section is a display invalid section in which an image among the image data is not displayed on the display panel.

* * * * *